Oct. 8, 1968    C. H. LE VEE    3,404,617

SELF-VENTILATING UNDERGROUND TRANSFORMER VAULT

Filed Oct. 3, 1966

INVENTOR
Clarence H. LeVee

BY
Hovey, Schmidt, Johnson & Hovey.
ATTORNEYS.

United States Patent Office 3,404,617
Patented Oct. 8, 1968

3,404,617
SELF-VENTILATING UNDERGROUND TRANSFORMER VAULT
Clarence H. Le Vee, Centralia, Mo., assignor to A. B. Chance Company, Centralia, Mo., a corporation of Missouri
Filed Oct. 3, 1966, Ser. No. 583,902
8 Claims. (Cl. 98—32)

ABSTRACT OF THE DISCLOSURE

A transformer vault has an air inlet and an air outlet at its top, and contains a pair of depending baffles associated with the inlet and the outlet for introducing incoming air at the bottom of the vault and exhausting the warm air from the outlet after passage of the air through the transformer chamber in thermal contact with both the sides and the top portion of the transformer. The baffle which directs the incoming air terminates relatively close to the bottom of the vault, while the other baffle is substantially shorter in vertical length to establish maximum thermal contact of the flowing air with the transformer body.

---

This invention relates to a self-ventilating vault or enclosure for heat-producing apparatus, such as a transformer, installed underground, which provides ventilation by convection and yet is constructed in a manner to provide a solid protective cover over the apparatus.

In recent years there has been a demand for the electric utility industry to install residential distribution lines underground instead of overhead on poles. This practice presents many new problems which did not exist previously or have not been solved when conductors were installed overhead.

One problem is encountered in the underground installation of a distribution type transformer and/or its associated equipment such as switches and fuses. In an aboveground location, heat dissipated by a transformer is readily transferred from within the transformer enclosure to atmosphere; however, in an underground installation the buried enclosure limits the radiation of heat to the atmosphere as well as dissipation by convection because the moisture content and type of soil determine how efficiently radiated heat is conducted away from the underground enclosure and, manifestly, convection is limited because of the lack of free space around the transformer. Additionally, a problem is encountered in protecting an underground transformer from falling debris and from the curious public who may walk over the vault from time to time.

It is, therefore, the primary object of this invention to provide an underground enclosure for heat-producing apparatus which will permit cooling of the apparatus by natural convection and also serve the necessary protective function.

It is a further object of the invention to provide an enclosure as aforesaid which cools the apparatus by a cross flow of cool ambient air which is directed into thermal contact with both the sides and the top portion of the apparatus so that the latter will be effectively bathed in the heat transfer medium.

A specific object of the invention is to provide an enclosure as aforesaid having internal baffles which are arranged to establish cross ventilation of the apparatus by ambient air which must necessarily enter the buried enclosure at the top thereof.

Additionally, it is an object to provide such an enclosure having a solid cover which overlies the apparatus for protective purposes and yet does not preclude efficient cooling thereof by convection.

Figure 1:
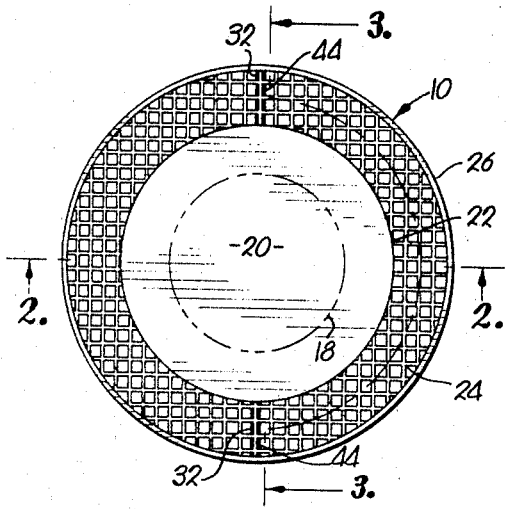
Figure 4:
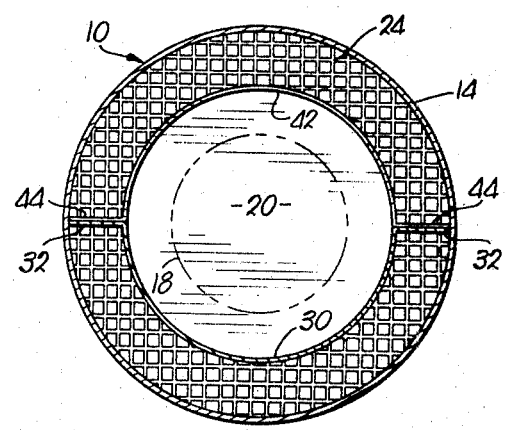
Figure 2:
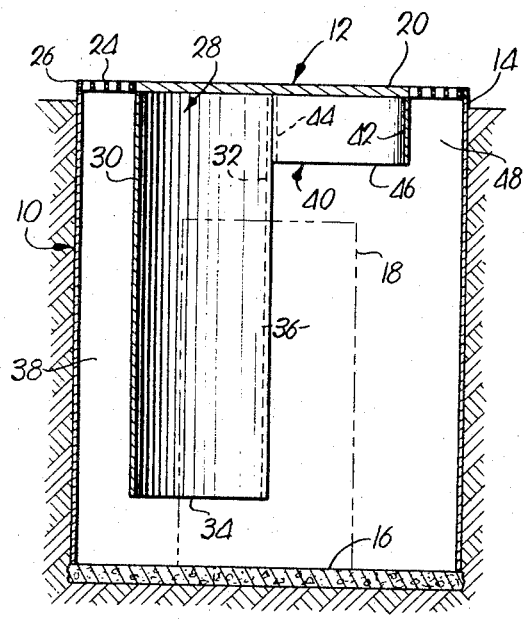
Figure 3:
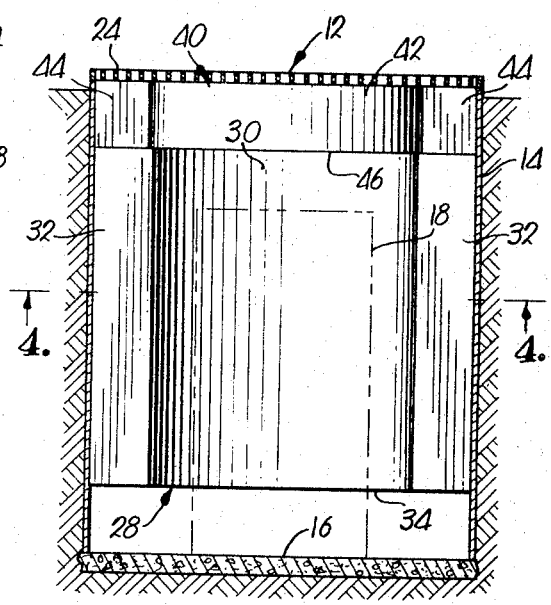

In the drawing:
FIGURE 1 is a plan view of an enclosure made in accordance with the instant invention;
FIG. 2 is a vertical sectional view taken along line 2—2 of FIG. 1, also illustrating the disposition of the enclosure in the ground;
FIG. 3 is a vertical sectional view taken along line 3—3 of FIG. 1; and
FIG. 4 is a horizontal sectional view taken along line 4—4 of FIG. 3.

An upright, cylindrical housing 10 is shown buried in the ground except for its top 12 and a small portion of the cylindrical, outer wall 14. The bottom 16 of housing 10 is formed by a suitable pad of crushed rock or gravel which supports a cylindrical transformer 18 or other heat-producing apparatus, shown in phantom lines.

Top 12 includes a cover member 20 in the form of a solid, horizontally disposed disc having a circular peripheral edge 22. An annular grate 24 surrounds cover 20 and is illustrated as being joined thereto at edge 22. Grate 22 extends radially outwardly from cover 20 and terminates at a rim 26 which overlies and is supported by wall 14.

A baffle 28 extends downwardly from beneath cover 20 and includes a semicylindrical panel 30 and a pair of radially outwardly extending wings 32 which are integral with the vertical edges of panel 30 and secured to wall 14. The baffle terminates in a lowermost end 34 spaced a relatively short distance above bottom 16 as compared with the overall vertical length of baffle 28. It will be appreciated that baffle 28 effectively divides the interior of housing 10 into a compartment 36 between the concave face of panel 30 and the right-hand half of wall 14 as viewed in FIG. 2, and a relatively narrow, semiannular, vertical passage 38 between the convex face of panel 30 and the adjacent semicylindrical half of wall 14. Transformer 18 is located within compartment 36, the latter being in communication with passage 38 at the lowermost end 34 of baffle 28.

A second, considerably shorter baffle 40 also extends downwardly from beneath cover 20, baffle 40 including a semicylindrical panel 42 and a pair of opposed, radially outwardly extending wings 44 integral with the vertical edges of panel 42 and secured to wall 14. As is clear in FIG. 4, panels 30 and 42 cooperate to form a cylinder at the upper portion of the interior of housing 10 beneath cover 20. FIGURES 2 and 3 reveal that the lower, semicircular margin 46 of panel 42 is disposed in vertically spaced relationship to the top of transformer 18.

Referring to FIG. 1, it will be appreciated that the semiannular, left-hand portion of grate 24 overlies passage 38, and that the right-hand, semiannular portion of grate 24 overlies a passage 48 (FIG. 2) defined by the convex face of panel 42, the adjacent semicylindrical internal surface of wall 14, and wings 44. Cover 20 is shown resting on the upper edges of panels 30 and 42 for added support, but primarily for the purpose of effectively sealing passage 38 from compartment 36 except between end 34 and bottom 16, and for the purpose of sealing passage 48 from the remainder of compartment 36 except at the lower margin 46 of panel 42. It will be appreciated hereinafter that the left-hand portion of grate 24, as viewed in FIGS. 1 and 2, forms an air inlet to housing 10, while the right-hand portion of grate 24 forms an outlet therefrom.

In use, electrical connections are made to transformer 18 through wall 14 or bottom pad 16. As heat is produced by the transformer, ambient air is drawn into passage 38 through the associated half of grate 24 when a temperature differential exists between the air surrounding the transformer in compartment 36 and the ambient air layer overlying the housing. The presence of baffle 40 effectively forms a chamber above transformer 18 between the concave faces of panels 30 and 42, but heated air in such chamber cannot flow to outlet passage 48 without first flowing beneath the lower margin 46 of panel 42. Therefore, cool air from inlet passage 38 which is heated and rises upwardly along transformer 18, is forced to flow completely across the top of the transformer in order to escape through the half of grate 24 overlying the outlet passage 48. Additionally, cool air is also directed around the sides of transformer 18 since the outlet is not directly above the transformer but is laterally spaced with respect thereto, causing the cool air to flow across compartment 36 and upwardly therethrough in order to reach outlet passage 48. Since incoming air is introduced at the bottom of compartment 36 and is forced to flow across such compartment, transformer 18 is effectively bathed in the cool ambient air which is brought into thermal contact with its sides as well as the top portion of the transformer. In this manner, efficient cooling is obtained since the heat transfer medium has maximum contact with the transformer body.

Top 12 may be locked in place by suitable means (not shown) for removal only by authorized personnel. The public is precluded from reaching the transformer with sticks or wires and the transformer is protected from falling debris since cover 20 directly overlies the transformer and establishes a barrier by virtue of the cooperating interengagement of cover 20 with panels 30 and 42.

Having thus described the invention, what is claimed as new and desired to be secured by Letters Patent is:

1. A convection cooler for heat-producing apparatus comprising:
   a housing for said apparatus,
   said housing having a bottom, a top, a wall between the top and the bottom surrounding said apparatus in spaced relationship to the latter when the same is in said housing, an inlet for flow of cool ambient air thereinto, and an outlet for flow of hot air therefrom;
   structure in said housing extending downwardly below the top, traversing said wall and terminating in a lowermost end spaced above said bottom for dividing the housing into a compartment for said apparatus and downwardly extending passage intercommunicating beneath said end,
   said inlet registering with said passage and said outlet registering with said compartment,
   the inlet and the outlet being above said end; and
   an air flow control in said compartment establishing a flow path for the incoming cool air from said end to said outlet extending completely across said compartment and upwardly therethrough to force the cool air to traverse both the sides and the top portion of the apparatus in thermal contact therewith when the apparatus is in the compartment, whereby to bathe the apparatus with said cool air as the cool air flows in said compartment toward said outlet.

2. The invention of claim 1,
   said structure including a baffle depending from said top,
   said inlet being disposed in said top.

3. The invention of claim 1,
   said control including a baffle extending downwardly below said top and terminating above said end,
   said baffle presenting a chamber in said compartment on one side of the baffle between the latter and the structure for receiving air rising from the apparatus as it is heated thereby, and a second passage on the opposite side of the baffle communicating with said outlet.

4. The invention of claim 3,
   said top including a cover member disposed to close said chamber thereabove.

5. The invention of claim 4,
   said outlet being disposed in said top.

6. A convection cooler for heat-producing apparatus comprising:
   a housing for said apparatus,
   said housing having a bottom, a top, a wall between the top and the bottom surrounding said apparatus in spaced relationship to the latter when the same is in said housing, an inlet for flow of cool ambient air thereinto, and an outlet for flow of hot air therefrom;
   structure in said housing extending downwardly below the top, traversing said wall and terminating in a lowermost end spaced above said bottom for dividing the housing into a compartment for said apparatus and a downwardly extending passage intercommunicating beneath said end,
   said inlet registering with said passage and said outlet registering with said compartment,
   the inlet and the outlet being above said end; and
   an air flow control in said compartment disposed to force the cool air flowing thereinto from said passage to traverse and thereby bathe the apparatus with said cool air, when the apparatus is in the compartment, as the cool air flows in said compartment toward said outlet,
   said structure including a first baffle depending from said top and defining said end between said wall and said apparatus when the latter is in the compartment,
   said baffle presenting said passage on one side thereof between the baffle and the wall and presenting said compartment on the opposite side of the baffle,
   said control including a second baffle depending from said top, spaced from said wall, and presenting a chamber in said compartment on one side of the second baffle between the latter and the first baffle for receiving air rising from the apparatus as it is heated thereby, and a second passage on the opposite side of the second baffle between the latter and the wall communicating with said outlet,
   said top including a cover member disposed to close said chamber thereabove.

7. The invention of claim 6,
   said inlet and said outlet being disposed in said top.

8. The invention of claim 7,
   said cover member being horizontally disposed and having a peripheral edge,
   said top having means defining said inlet and said outlet adjacent said edge of the cover member.

References Cited

UNITED STATES PATENTS 2,100,721  11/1937  Parsons _____ 174—37 X
3,271,710  9/1966  Leonard _____ 165—47 X ROBERT A. O'LEARY, *Primary Examiner.*